(12) United States Patent
Kim et al.

(10) Patent No.: US 10,832,460 B2
(45) Date of Patent: Nov. 10, 2020

(54) METHOD AND APPARATUS FOR GENERATING IMAGE BY USING MULTI-STICKER

(71) Applicant: Seerslab, Inc., Seoul (KR)

(72) Inventors: Jae Cheol Kim, Seoul (KR); Jin Wook Chong, Santa Clara, CA (US)

(73) Assignee: Seerslab, Inc., Seoul (KR)

( * ) Notice: Subject to any disclaimer, the term of this patent is extended or adjusted under 35 U.S.C. 154(b) by 0 days.

(21) Appl. No.: 16/308,396

(22) PCT Filed: Jun. 8, 2017

(86) PCT No.: PCT/KR2017/005964
§ 371 (c)(1),
(2) Date: Apr. 11, 2019

(87) PCT Pub. No.: WO2017/213439
PCT Pub. Date: Dec. 14, 2017

(65) Prior Publication Data
US 2019/0295300 A1    Sep. 26, 2019

(30) Foreign Application Priority Data
Jun. 8, 2016  (KR) .................... 10-2016-0071087

(51) Int. Cl.
*G06T 11/00*   (2006.01)
*G06T 11/60*   (2006.01)
*H04N 5/262*   (2006.01)
*H04N 5/272*   (2006.01)
*H04N 5/265*   (2006.01)
*H04N 21/431*  (2011.01)
*H04M 1/725*   (2006.01)

(52) U.S. Cl.
CPC ............ *G06T 11/60* (2013.01); *G06T 11/001* (2013.01); *H04M 1/725* (2013.01); *H04N 5/2621* (2013.01); *H04N 5/272* (2013.01)

(58) Field of Classification Search
CPC ............ G06F 3/04817; G06F 3/04845; G06F 17/241; G06F 17/2785; G06T 11/60; G06T 3/40; G06T 2200/24; G06T 19/006; H04N 5/265; H04N 21/4316; H04N 21/4788; H04L 51/32; G06Q 30/0276
USPC ........................................................ 345/633
See application file for complete search history.

(56) References Cited

U.S. PATENT DOCUMENTS

| | | | |
|---|---|---|---|
| 9,389,485 B2 * | 7/2016 | Tada | G03B 15/07 |
| 9,549,084 B2 * | 1/2017 | Imahira | H04N 1/00289 |
| 2008/0144094 A1 * | 6/2008 | Itoh | G06F 16/58 |
| | | | 358/1.15 |

(Continued)

*Primary Examiner* — Jin Cheng Wang
(74) *Attorney, Agent, or Firm* — Ravi Mohan; Rutan & Tucker, LLP

(57) ABSTRACT

Disclosed is a method and apparatus for generating an image using multi-stickers. The method for generating an image according to an embodiment of the present invention comprises the steps of: displaying a subject photographed by a camera; applying the selected stickers or effects to the subject being displayed when a plurality of stickers or effects are selected among previously provided stickers or effects by a multi-sticker function; and generating an image of the subject to which the selected stickers or effects are applied, according to a photographic command.

14 Claims, 7 Drawing Sheets

(56) References Cited

U.S. PATENT DOCUMENTS

| | | | |
|---|---|---|---|
| 2015/0124105 A1* | 5/2015 | Imahira | H04N 1/00289 |
| | | | 348/207.1 |
| 2015/0138378 A1* | 5/2015 | Imahira | H04N 1/00161 |
| | | | 348/207.2 |
| 2015/0205503 A1* | 7/2015 | Gotohda | G06F 3/04812 |
| | | | 715/765 |
| 2015/0206310 A1* | 7/2015 | Okada | G06T 3/40 |
| | | | 348/222.1 |
| 2015/0206349 A1* | 7/2015 | Rosenthal | H04N 21/41407 |
| | | | 345/633 |
| 2015/0222586 A1* | 8/2015 | Ebersman | G06F 17/276 |
| | | | 715/752 |
| 2015/0222617 A1* | 8/2015 | Ebersman | H04L 51/12 |
| | | | 726/4 |
| 2015/0304554 A1* | 10/2015 | Matsubara | H04N 5/23222 |
| | | | 348/239 |
| 2016/0274769 A1* | 9/2016 | Sakahara | G06F 3/04845 |
| 2016/0323507 A1* | 11/2016 | Chong | G06T 13/80 |
| 2016/0334972 A1* | 11/2016 | Cheng | G06F 3/04845 |
| 2017/0192651 A1* | 7/2017 | Yang | G06F 3/04845 |
| 2017/0372525 A1* | 12/2017 | Rosenthal | H04N 21/41407 |

\* cited by examiner

[Figure 1]

[Figure 2]
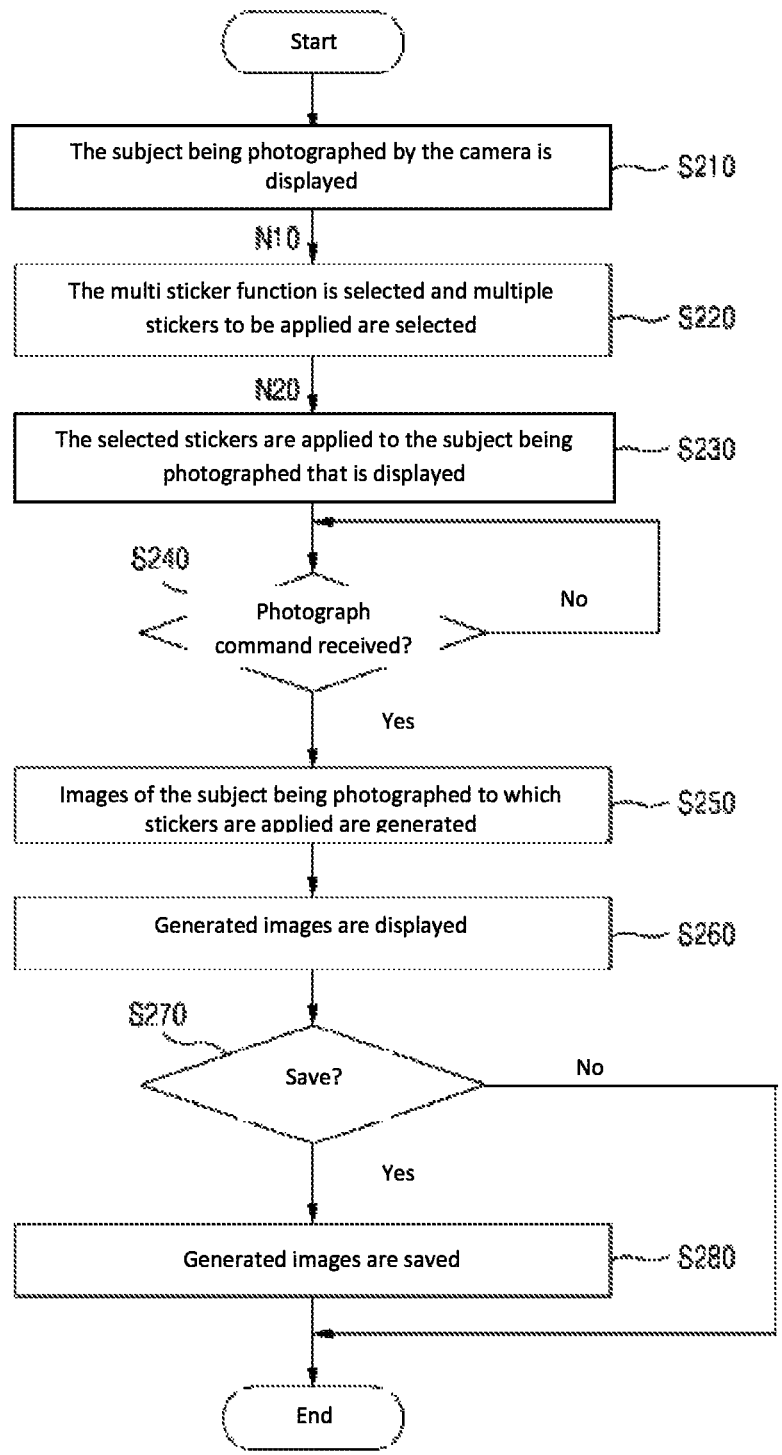

[Figure 3]
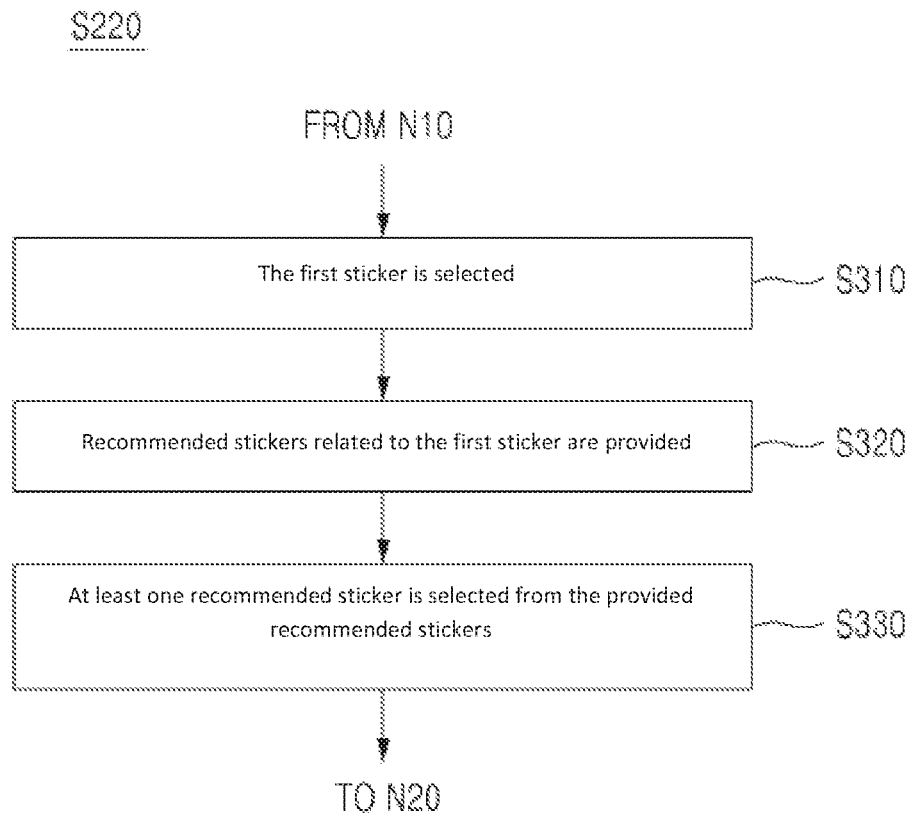
[Figure 4]

[Figure 5]
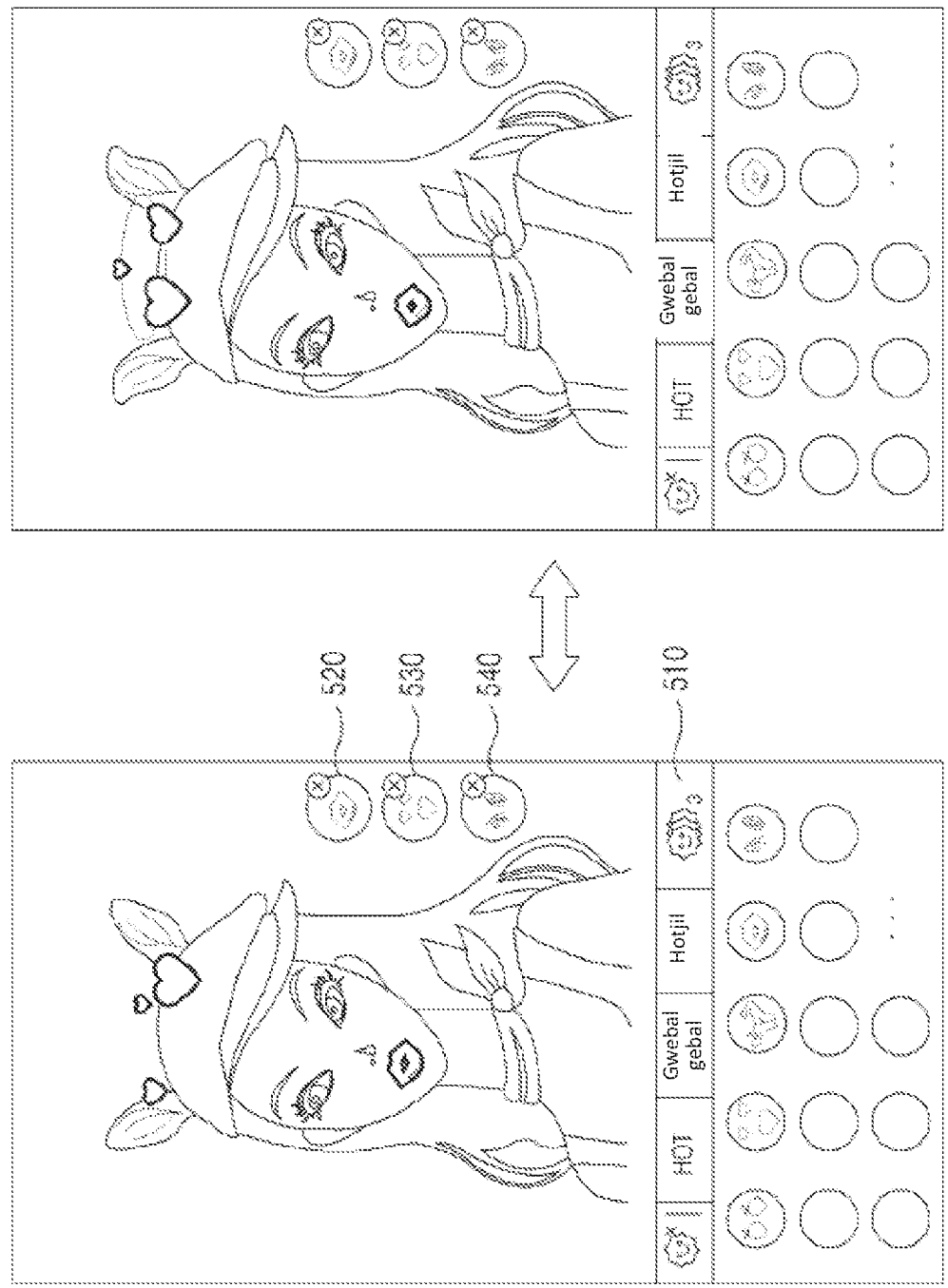

[Figure 6]
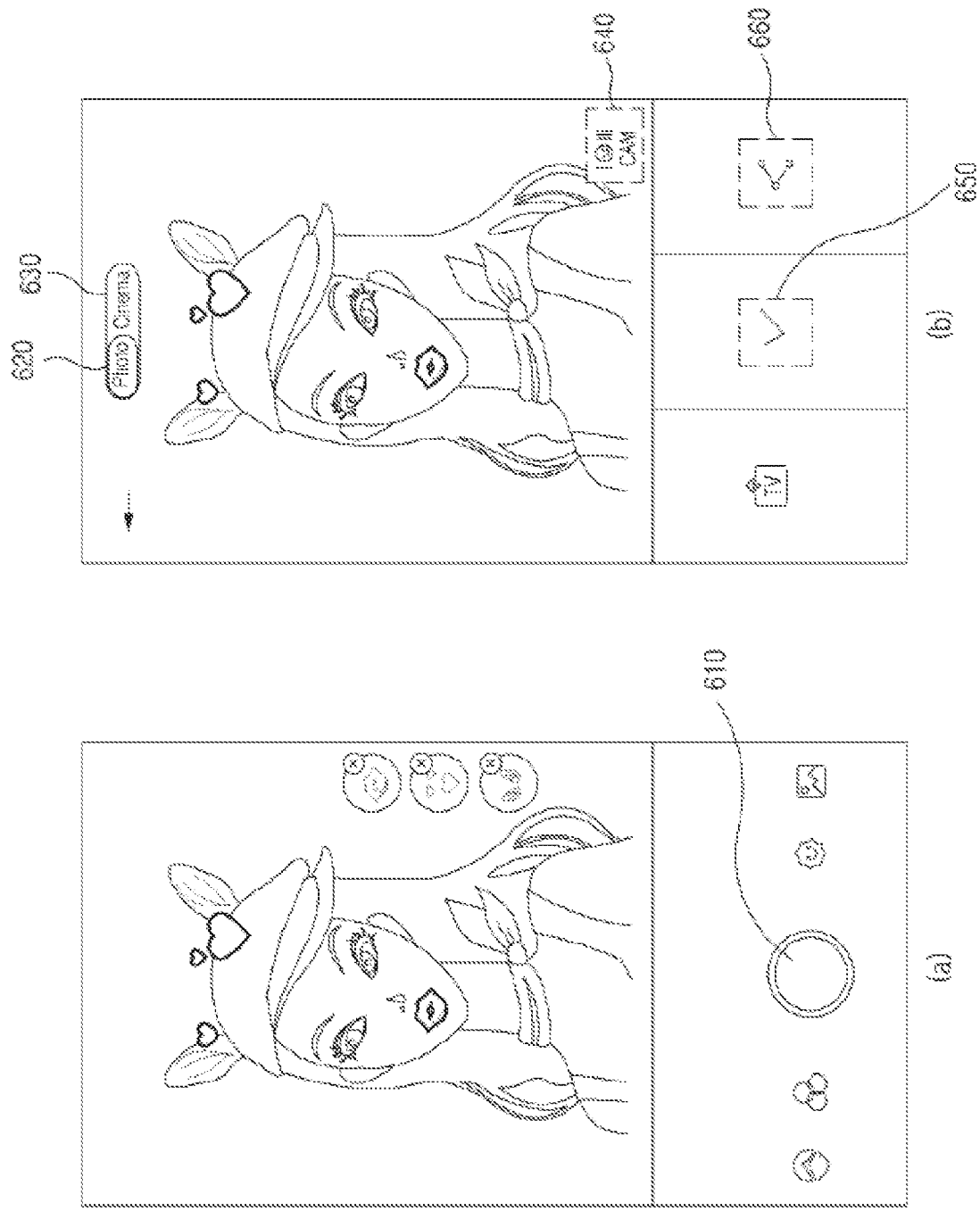

[Figure 7]
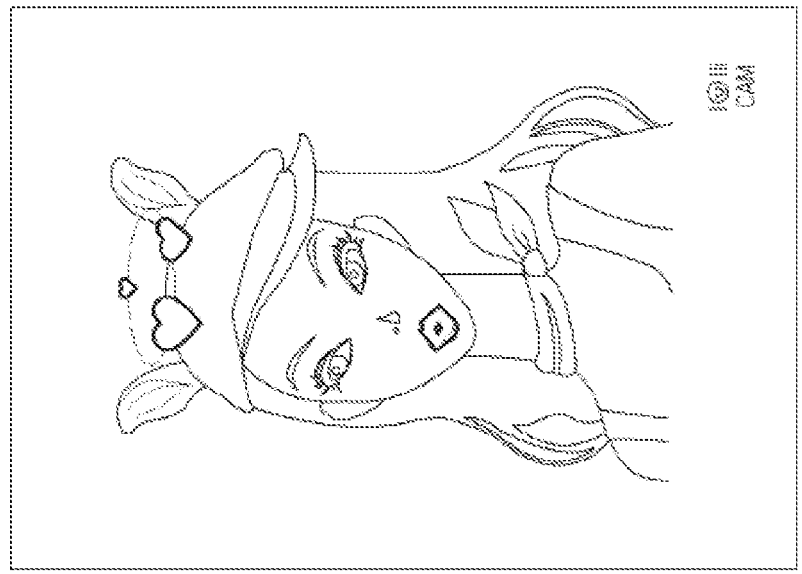
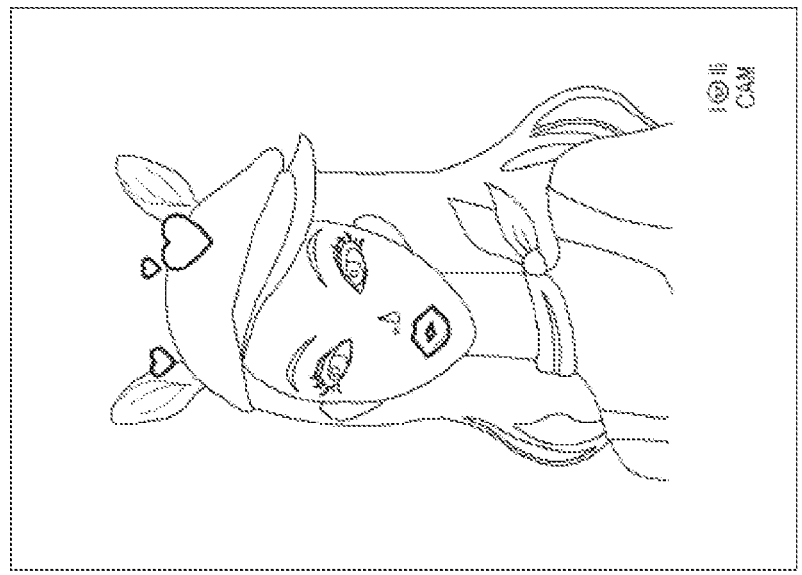

[Figure 8]
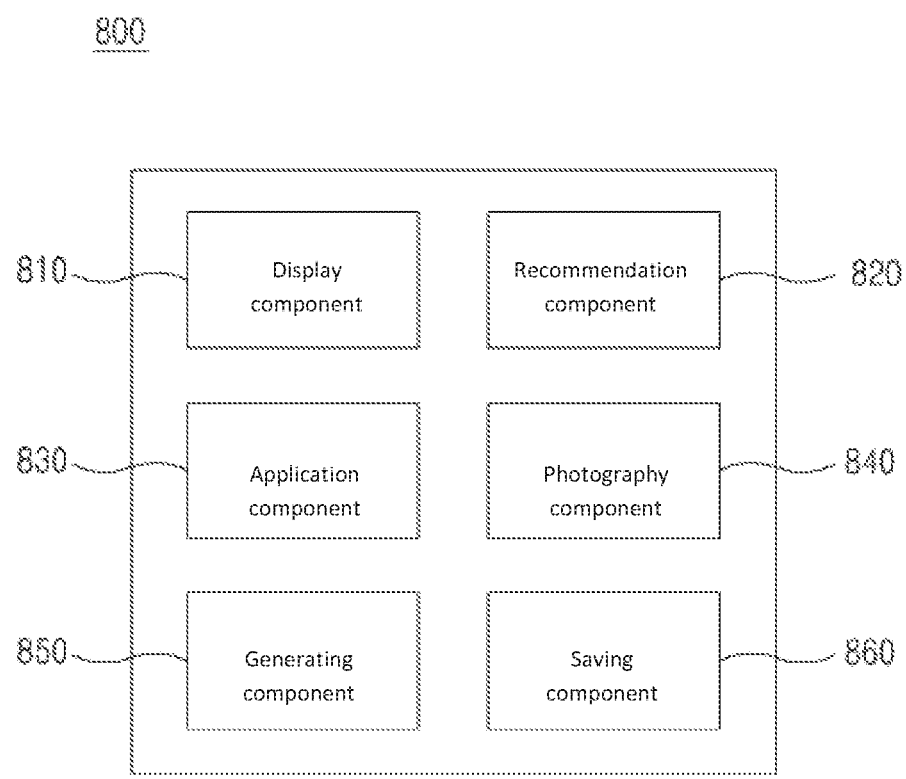

METHOD AND APPARATUS FOR GENERATING IMAGE BY USING MULTI-STICKER

TECHNICAL FIELD

The present invention pertains to the generation of images. More specifically, the present invention pertains to a method of and an apparatus for generating images by applying multiple stickers or effects on the subject being displayed.

BACKGROUND TECHNOLOGY

Such devices as smartphones provide not only the telephone function but also various supplementary functions to enhance user convenience, and are becoming indispensable items.

Smartphones are equipped with a camera, so a smartphone user can use the camera to take photographs, and then save these photographs and later bring back these photographs, use these photographs as background pictures, send these photographs to others using email of telephone numbers, and can share these photographs through various messengers, SNS programs, etc.

Also, many applications for cameras installed on smartphones have such editing functions or sticker functions such as adding emoticons, stickers, and effects on the subjects being photographed, and it is possible to make various forms of photographs using sticker functions of such sticker functions.

With the existing applications, it is possible to apply a sticker or effect on a photograph already taken or on a subject being photographed and it is not possible to apply multiple stickers or effects at the same time.

Therefore, a method to generate images by applying multiple stickers or effects becomes necessary.

DETAILED DESCRIPTION OF THE INVENTION

Technical Issues

The embodiments of the present invention provide a method of and an apparatus for generating photographs or devices by applying multiple stickers or effects on subjects being photographed.

The embodiments of the present invention provide a method of and an apparatus for easily applying multiple stickers on images by generating images by applying stickers or effects produced using video files.

Means of Resolving Technical Issues

The method of generating images in accordance with an embodiment of the present invention includes the stage in which the subject being photographed by the camera is being displayed; the stage in which when multiple stickers or effects are selected by the multi-sticker function, the above selected stickers o effects are applied to the above displayed subject being photographed; and the stage in which the images for the above subjects being photographed to which the above selected stickers or effects are applied are generated in accordance with photography commands.

During the stage in which the above displayed subjects being photographed are being applied, when a sticker or effect is selected after the stickers or effects selected by the user reach the maximum number, it is possible to eliminate the stickers or effects selected first among the stickers already selected, and to apply any of the above stickers or effects.

Furthermore, with the method of generating images in accordance with an embodiment of the present invention, when a sticker or effect to be applied to the above subject being photographed is selected by the user, additional stage in which at least one recommended sticker or recommended effect is provided related to any one sticker or effect selected above.

Furthermore, the method of generating images in accordance with an embodiment of the present invention could further include the stage in which when stickers or effects for any specific region are selected by the user, at least one recommended sticker or recommended effect related to the above specific region is provided.

Furthermore, the method of generating images in accordance with an embodiment of the present invention could include the stage in which when a sticker or effect for a particular advertisement is selected by the user, at least one recommended sticker or recommended effect related to the above specific advertisement I provided.

Furthermore, the method of generating images in accordance with an embodiment of the present invention could further include the stage in which when the stickers or effects selected by the user reach the maximum number, the function of adding stickers or effects is inactivated.

Each of the stickers or effects provided in advance could be a video format file or consecutive image files.

The method of generating images in accordance with another embodiment of the present invention includes the stage in which any one image selected from saved multiple images is displayed; the stage in which when multiple stickers or effects are selected by the multi sticker function from the stickers or multi sticker functions already provided, the above selected stickers or effects are applied to any one image selected above; and the stage in which an image to which the above selected stickers or effects are applied is generated for the above selected image.

During the stage in which the above selected image is being applied, after the stickers or effects selected by the user reach the maximum number; when a sticker or effect is selected those stickers or effects selected first could be eliminated, and any one of the above stickers or effects could be additionally applied.

Furthermore, with the method of generating images in accordance with another embodiment of the present invention, when a sticker or effect to be applied to an image selected by the user, the stage in which at least one recommended sticker or recommended effect related to any one sticker or effect selected above is provided could be included.

The image generating apparatus in accordance with an embodiment of the present invention includes the display component that displays the subject being photographed by the camera; when multiple stickers or effects are selected by the multi sticker function from the stickers or effects provided in advance, the application component that applies the above selected stickers or effects on the subject being photographed that is being displayed; and the image generator that generates images for the above subject being photographed to which the above selected stickers or effects are applied in accordance with photograph commands.

When any one sticker or effect is selected after the stickers or effects selected by the user reach the maximum number, the above application component could eliminate the sticker or effect selected first and could add any one of the above sticker or effects.

Furthermore, the image generating apparatus in accordance with an embodiment of the present invention could further include a recommendation component that when a sticker or effect to be applied to the above subject being photographed is selected recommends at least one sticker or recommended effects related to the above selected sticker or effect.

Furthermore, with the image generating apparatus in accordance with an embodiment of the present invention, a recommending component that when a sticker or effect for a particular region is selected by the user provides at least one recommended sticker or recommended effect related to the above particular region.

Furthermore, the image generating apparatus in accordance with an embodiment of the present invention could further include the recommending component that when a sticker or effect is selected by the user at least one recommended sticker or recommended effect related to the above particular advertisement is provided.

With the above application component, when the number of stickers or effects selected by the user reaches the maximum level, the function to add stickers or effects could be deactivated.

Each of the above stickers or effects provided in advance could be a video format file or consecutive image files.

Effects of the Invention

In accordance with the embodiments of the present invention, it is possible to generate images to which various stickers or effects are applied by generating photographs or videos by applying multiple stickers or effects on the subject being photographed.

With the embodiments under the present invention, by applying moving stickers or effects on the subject being photographed and by making the applied multiple stickers or effects move while maintaining the subject being photographed in the captured state to generate moving images, it is possible for those without professional knowledge to produce moving images.

In accordance with the embodiments of the present invention, due to the fact that it is possible to apply various moving stickers or effects, it is possible to create images to which various stickers and effects are applied.

The stickers or effects applied to the embodiments of the present invention could be produced in a video format file or in consecutive image files, and due to the fact that the images are produced in video format files, it is easy to apply multiple stickers or effects on the subject being photographed that is being displayed on the screen or on already-saved images.

The embodiments of the present invention could be applied to such devices as smartphones equipped with cameras. Due to the fact that it is possible to install applications related to the present invention to smartphones, it is possible to provide smartphone users with images on which various stickers or effects are applied, for example photographs or videos, and through this the user could be provided with various enjoyments.

BRIEF DESCRIPTION OF THE DRAWINGS

FIG. 1 an illustration to describe the present invention.

FIG. 2 illustrates a flow diagram of the actions for the method of generating images in accordance with an embodiment of the present invention.

FIG. 3 illustrates a flow diagram of the actions of an embodiment for stage S220 illustrated in FIG. 2.

FIG. 4 through FIG. 7 are illustrative drawings to describe the method under the present invention.

FIG. 8 illustrates the configuration of the image generating apparatus in accordance with an embodiment of the present invention.

BEST FORMAT TO EMBODY THE PRESENT INVENTION

For example, with the moving stickers or effect of the video format file, the video image space is divided into the image channel area and the alpha channel area, and for each of the video images' animation frames, frame images in which both the image channel and the alpha channel exist could be produced, and animation stickers could be produced based on video images using multiple animation frames.

Namely, when the stickers or effects applied to the present invention are produced in video format files, it is easy to apply multiple stickers or effects together. Of course, the stickers or effects applied to the present invention are not limited to video files, and animation stickers or effects produced using existing methods could be used.

FIG. 1 is an illustration to describe the present invention. As illustrated in FIG. 1, the present invention could be applied to a device equipped with a camera (100), for example to such a device as a smartphone. By installing in the form of applications to smartphones, etc., when the subject being photographed is being photographed using a camera multiple stickers or effects selected by the user can be applied to the subject being photographed in order to generate images, namely photographs or videos, to which selected multiple stickers or effects are applied.

With the present invention, when multiple moving stickers (or animation stickers) or effects are applied, moving photographs or videos to which moving stickers or effects are applied can be generated.

Here, the subject being photographed could include for example people, buildings, automobiles, etc., and the location of application of the multiple stickers or effects selected by the user could be determined by the selected stickers or effect information and by the object information included in the subject being photographed.

Here, for convenience of description, with the present invention the present invention is carried out with a smartphone equipped with a camera, and photographs to which multiple stickers are applied are generated. Of course, it is clear to those who work in this technical field that the present invention is not limited to being applied to smartphones, and that the present invention can be applied to all devices to which the present invention can be installed.

FIG. 2 illustrates a flow diagram of the actions for generating images in accordance with an embodiment of the present invention.

When referring to FIG. 2, with the method of generating images in accordance with an embodiment of the present invention, the application under the present invention is activated, and the subject being photographed by the camera on which the application is installed, for example such subjects being photographed including automobiles, sceneries, people, and so on are displayed on the screen (S210).

The subject being photographed displayed in stage S210 could be applied with various filter functions according to the user's selection, and the camera's various functions to photograph the subject being photographed could be applied.

When the subject being photographed is displayed on screen in stage S210, the multi sticker function to apply multiple stickers on the displayed subject being photographed is selected, and based on the user's input among the multiple stickers provided by the applications under the present invention only certain number of stickers to be applied to the subject being photographed are selected (S220).

Here, stage S220 could provide the single sticker function in which only one sticker is applied and the multi sticker function described above, and the single sticker function and the multi sticker function could be applied differently according to the selection of the buttons formed in specific areas.

The animation stickers or moving stickers provided under the present invention could be video format files or animation stickers produced with consecutive image files or moving stickers, and the moving stickers applied to the subject being photographed is provided by the application that provides the method under the present invention, and there could be various effects or stickers such as the moving rabbit ear effect, the moving cloud effect, the moving heart effect, the effect of the heart balloon going upward, the moving butterfly effect, and so on.

In stage S220, when a sticker is selected again after the number of stickers selected by the user using the multi sticker function reaches the maximum, it is possible to eliminate a sticker among the already selected stickers, for example the sticker that was selected the first time, and to apply any one of the stickers to the subject being photographed.

Depending on the situation, in stage S220, when the number of stickers selected by the user using the multi sticker function reaches the maximum level, the sticker adding function is deactivated, thereby preventing additional selection of stickers. In order to add stickers in such a situation, it is possible to activate the sticker adding function by eliminating at least one of the already selected stickers. Therefore, it is possible to add new stickers.

Furthermore, with stage S220, when a sticker is selected the user, recommended stickers related to the selected sticker could be provided. For example, in stage S220, as illustrated in FIG. 3, when the first sticker among the multiple stickers already provided under the present invention is selected by the user after the multi sticker function is selected by the user, the selected first sticker is applied real time to the subject being photographed and displayed on the screen, and the recommended stickers related to the selected first sticker are provided (S310, S320).

Here, in stage S320, in the event that the first sticker selected by the user is a sticker regarding a particular region, recommended stickers related to the particular region could be provided, and in the event that the first sticker selected by the sticker is a sticker regarding a specific advertisement, it is possible to provide recommended stickers related to the particular advertisement.

In stage S320, in the event that the first sticker is selected, recommended stickers for the first sticker could be provided based on the statistics for the other stickers selected along with the first sticker.

In the event that at least one sticker among the recommended stickers provided in stage S320 is selected by the user, the sticker could be applied real time to the selected recommended sticker or subject being photographed (S330).

Of course, it is not necessary to select stickers to be applied on the subject being photographed from the recommended stickers provided in stage S320, and even if the user wants to select other stickers, it is possible to select stickers from the stickers provided by the application under the present invention.

Such a recommended sticker function could be provided automatically, and whether recommended stickers are provided or not could be determined based on the setup of the sticker recommendation function.

When referring to FIG. 2 again, when multiple stickers are selected by the user in stage S220, each of the multiple stickers is photographed by the camera and the stickers are applied to the subject being photographed that is being displayed on the screen and whether the photograph commands in accordance with the user's inputs are determined (S230, S240).

In stage S230, the application location of each of the multiple stickers selected by the user on the subject being photographed based on the object included in the subject being photographed by the camera is determined, and it is possible to apply the selected stickers to the determined application locations. For example, when the moving rabbit ears or moving lips are selected by the user, the location of the head of the person being photographed is obtained to apply the moving rabbit ears on the location of the person's head, and the location of the person's lips is obtained to apply the moving lips to the location of the person's lips.

In stage S230, in the event that the subject being photographed displayed on the screen is moved by the movement of the user, the location of the stickers being applied according to the movements could be changed as well. Of course, in the event that at least one of the stickers selected by the user is not applied to the subject being photographed displayed on the screen, it is possible not to apply on the subject being photographed the sticker not being applied among the stickers selected, and it is possible to notify the user that the sticker is not being applied.

Based on the determination of stage S240, when the photograph commands are received by the user's input, images to which multiple stickers are applied to the subject being photographed displayed on the screen are generated, and the generated images are displayed on the screen (S250, S260).

For example, when the photograph command is received by the user's input, the subject being photographed to which multiple stickers selected by the user is captured to generated captured images, and the generated captured images are displayed on the screen.

Here, the images generated by stage S250 are images that capture the subject being photographed and multiple moving stickers in the event that the images are generated by photographing, and in the event that the images are generated by videotaping, the images mean the subject being photographed and multiple moving stickers that are moving. When the save button on the screen is pressed by the user, the images generated and displayed on the screen could be saved, and the generated or saved images could be shared through at least one application determined in advance, for example such messenger services as Line and Kakao Talk, bands, SNS, etc.

Furthermore, in stage S260, in the event that images are generated by photographing, it is possible to display on the screen the capture images in which the subject being photographed and multiple stickers are captured based on the user's input, and moving photographs in which the subject being photographed is captured and multiple stickers are moving could be displayed on the screen.

In stage S260, captured images or moving photographs could be generated and displayed based on the photograph generation button formed in part of the images generated and displayed on the screen or formed in some areas on the screen.

While the images generated in stage S260 are being displayed, whether the images generated through the user's input have been saved is determined, and when the save button is selected by the user's input, the generated images are saved in files (S270, S280).

For example, in stage S280, in the event that captured images are generated, these images could be saved as JPG files, and in the event that moving photographs are generated, the generated images could be saved as GIF (graphics interchange format) files, and in the event that videos are generated, these videos could be saved as MPEG files.

Of course the images generated and saved in stage S260 and S280 could be shared through at least one application determined in advance, for example messenger services such as Line and Kakao Talk, and Band, SNS, etc.

The method of generating images in accordance with an embodiment of the present invention composed of the process described above is described in detail below by referring to FIG. 4 through FIG. 7. In FIG. 4 through FIG. 7, the instance in which the subject being photographed is applied with multiple stickers is being photographed is described.

FIG. 4 through FIG. 7 are illustrative drawings to describe the method under the present invention.

When referring to FIG. 4 through FIG. 7, with the method of generating images in accordance with an embodiment of the present invention, when the application to carry out the present invention is carried out by the user, the subject being photographed that is being photographed by the camera equipped on or connected to the device on which the application is installed is displayed on one area on the screen, as illustrated in FIG. 4.

Here, in some areas on the screen on which the subject being photographed is displayed, it is possible for methods to set up or change various functions regarding camera photographing could be displayed together, and in some part of the screen, the user interface to select specific modes, to check saved images, to select the stickers to be applied, to select the photography mode, etc. could be displayed.

In FIG. 4, when the user selects the sticker selection button (410) to select multiple stickers, as displayed in FIG. 5 various stickers that could be applied are displayed on some part of the screen, and the multiple sticker selection function button (510) is displayed in some areas of the screen.

Here, with the sticker selection function button (510), the user may select the single sticker selection function to select a single sticker or the multiple sticker selection function to select a predetermined number of stickers, for example three stickers. The present invention is about photographing based on the multi sticker selection, and description will be provided based on the assumption that the multi sticker selection function has been set up.

Among the various moving stickers provided by the application, when multiple stickers are selected by the user, for example the moving lips (520) in FIG. 5, the moving heart (530), and the moving rabbit ears (540) are sequentially selected, the object, here a person, is being searched and the location of the person's lips is obtained and the moving lips (520) are applied to the obtained location of the lips, and the location of the person's head is obtained to apply the moving heart (530) and the moving rabbit ears (540) on the location of the obtained lips.

As illustrated in the left drawing of FIG. 5, the moving lips (520) applied to the subject being photographed repeatedly moves from the shape of the lips that are flat to the shape of the lips that are rolled up as illustrated in the right drawing of FIG. 5, and as illustrated by the left drawing of FIG. 5, the moving heart (530), many hearts move repeatedly in the form in which many hearts rotate on the top of the head. The moving rabbit ears (540) move repeatedly from the form in which the rabbit ears stand up as illustrated by the left drawing of FIG. 5 to the form in which the rabbit ears are bent, as illustrated by the right drawing of FIG. 5. Of course, the moving lips (520), the moving heart (530), and the moving rabbit ears (540) are not limited by the forms described above, and various movements that can be applied could be used.

As described previously, when the moving lips (520), the moving heart (530), and the moving rabbit ears (540) are selected by the user in FIG. 5, the selected moving lips (520), moving heart (530), and moving rabbit ears (540) are applied to the locations of the lips and head of the person being photographed by the camera, so that the person's lips and head are displayed on the screen with the moving lips, moving heart and moving rabbit ears attached.

When the person's movements occur on the screen, the selected lips, heart, and rabbit ears could be applied to the location of the person's lips and the location of the person's head obtained real time.

As illustrated in FIG. 5, when the photographing command is received after the user selects the photography button (610) as illustrated in FIG. 6a while the moving stickers are being applied to the subject being photographed, at the point in time the photography command is received, the images displayed on the screen are captured, and the captured images are generated.

Here, since the captured images generated are the images that capture the displays on the screen at the point in time the photography command I received, the moving lips, the moving heart, and the moving rabbit ears applied to the subject being photographed are captured without moving.

When captured images are generated, as illustrated in FIG. 6b, the captured images are displayed on the screen, and the button to display the captured images on the screen and to generate captured images on some areas of the captured images and the button to generated moving photographs, for example the Photo button (620) and the Cinema button (630) are generated, and the watermark (640) set up in advance is also generated in some areas of the captured images. Also, in some areas of the screen, a button (650) to save captured images or moving photographs and a button (660) to select applications with the sharing function in order to share captured images or moving pictures are displayed.

When the save button (650) is pressed by the user while images are being displayed, as illustrated in FIG. 6b, the images captured on the screen are saved in certain photograph file formats, for example JPG.

Also, when any one of the applications to share captured images is selected by the user through the selection of the sharing button (660), it is possible to share the captured images with other people through the selected application.

On the other hand, the button (630) to generate moving photographs in FIG. 6b is selected by the user, the subject being photographed maintains the captured stage while the applied multiple moving stickers, which are the moving lips, moving heart, and moving rabbit ears are to move in the captured locations, so that as the left drawing of FIG. 7 and the right drawing of FIG. 7 are displayed repeatedly, the lips are moving in the location of the person's lips and the rabbit ears and the hear are moving in the location of the person's head.

When the save button is pressed while the generated moving photographs are displayed as illustrated in FIG. 7, the moving photographs generated on the screen could be saved in a certain format, for example in GIF files, and through the selection of the sharing button, it is possible to share with other people through the selection of the sharing button the moving photographs generated through any one of the sharing applications.

The buttons provided by the user interface illustrated in FIG. 4 through FIG. 7 are not limited to specific locations and the locations and functions could be determined by the business entity that provides the present invention.

As described, with the method of generating images in accordance with an embodiment of the present invention, photographs or videos are generated by applying multiple stickers or effects, so that it is possible to generate images to which various stickers or effects are applied, and it is possible to produce moving images without professional knowledge.

Also, due to the fact that with the method of generating images in accordance with an embodiment of the present invention it is possible to apply various types of moving stickers or effects on the subject being photographed, it is possible to produce various images to which various stickers and effects are applied.

Also, with the method of producing images in accordance with the present invention, when the subject being photographed is photographed, not only multiple stickers are applied to generate images but also multiple stickers can be applied to already saved images to generate images with moving stickers. Namely, with the method in accordance with another embodiment of the present invention, an image from the images already saved is selected and displayed on the screen, and when multiple stickers or effects to be applied by the multiple sticker function from the stickers or effects provided in advance are selected, the selected stickers or effects are applied to any selected image, and a new image in which the selected stickers or effects are applied to the selected image is generated. Besides the above, the configuration to determine the location where stickers are to be applied, the configuration that provides recommended stickers related to the selected stickers in the event that any one sticker is selected, the saving configuration, and so on could be applied along with the configurations that were described in FIG. 2 through FIG. 6.

FIG. 8 illustrates the configuration of an image generating apparatus in accordance with an embodiment of the present invention, and illustrates the apparatus to generate images described in FIG. 2 through FIG. 7.

Here, the video generating apparatus could be configured by including all devices installed with a camera.

When referring to FIG. 8, the image generating device (800) in accordance with an embodiment of the present invention includes a display component (810), a recommendation component (820), an application component (830), a photography component (840), a generation component (850), and a saving component (860).

The display component (810) is the method of displaying all data related to the present invention such as the subject being photographed by the camera of a device, the images captured by the camera, the moving photographs generated using the captured images, videos, user-interfaces, and so on.

Here, the display component (810) is a method of displaying data and for example could be a touch screen installed on a smartphone.

When any sticker or effect to be applied to the subject to be photographed being displayed on the screen is selected by the user, the recommendation component (820) provides at least one recommended sticker or recommended effect related to the selected sticker or effect.

In the event that the sticker selected by the user is a sticker for any particular region, the recommendation component (820) may provide stickers related to the particular region, and in the event that the sticker selected by the user is for any particular advertisement, it is possible to provide recommended stickers related to the particular advertisement.

When a sticker is selected, the recommendation component (820) could provide recommended stickers for the selected sticker based on the statistics regarding other stickers that are selected along with the selected sticker.

When multiple stickers or effects are selected by the multi sticker function from the stickers or effects provided in advance by the application component (830), these stickers or effects are applied to the subject being photographed that is being displayed on the screen.

The application component (830) can determine the application location of each of the moving stickers selected by the user on the subject being photographed based on the object included in the subject being photographed by the camera, and can apply the selected stickers on the determined application locations.

In the event that movements occur in the subject being photographed displayed on the screen by the movement of the user that photographs the subject being photographed, the application component (830) can change the locations of the stickers in accordance with the movements that are occurring.

Furthermore, when a sticker or effect is selected after the number of stickers or effects selected by the user reaches the maximum level, the application component (830) can eliminate the sticker or effect that was selected first and additionally apply any of the above stickers or effects.

Also, depending on the situation, when the number of stickers selected by the user reaches the maximum level, the application component (830) uses the multi sticker function to deactivate the sticker adding function, thereby preventing additional selection of stickers.

In the photography mode to photograph the images under the present invention the photography component (840) photographs the images of the subject being photographed using a camera.

In accordance with the photography commands entered by the user, the generating component (850) generates images with multiple stickers applied to the subject being photographed displayed on the screen.

At this time, the generating component (850) captures the subject being photographed and the applied stickers at the point in time the photography commands are received to generate captured images and generated captured images are provided to the display component (810) in order to display the generated captured images, and when the moving photograph generating button formed in some areas on the displayed captured image is selected by the user, moving photographs with only the stickers that move in capture images can be generated.

The captured images and moving photographs or videos generated by the generating component (850) could be shared with other people through at least one application determined in advance.

When the save button to save the images provided through the user interface is selected by the user, the saving component (860) saves the images generated and displayed on the screen.

For example, when the save command for the captured images of the subject being photographed to which stickers have been applied is received, the saving component (860) saves the captured images as JPG files, and when the saving command for the moving photographs to which stickers are applied is received, the moving photographs are saved as GIF files.

Here, the saving component (860) can save all data to carry out the present invention, for example algorithms, applications, various effects, captured images, and moving photographs.

Of course, it is clear to those who work in this technical field that other devices in accordance with other embodiments of the present invention could perform all the functions described in FIG. 2 through FIG. 7.

The system or device described above could be embodied with hardware components, software component and/or a combination of hardware components and software components. For example, the system, device, and components described with the embodiments could be embodied using one or more general computers or special purpose computers such as a processor, a controller, an ALU (arithmetic logic unit), a digital signal processor, a microcomputer, an FPA (field programmable array), a PLU (programmable logic unit), a microprocessor, or any device capable of carrying out and responding to instructions. The processing device is able to carry out an operating system (OS) and one or more software applications operated on the above operating system. Also, the processing device is capable of accessing, saving, manipulating, processing, and generating data by responding to the operating of software. For convenience of understanding, there are instances in which it is described that only a single processing device is being used, but those with ordinary level of knowledge in the applicable technical field know that the processing device could include multiple processing elements and/or multiple types of processing elements. For example, the processing device could include multiple processors or a single processor and a single controller. Also, other processing configurations as parallel processors are possible.

Software could include a computer program, codes, instructions, or combination of any of the above, and it is possible to configure the processing device to operate as desired or to command the processing device independently or collectively. In order to be interpreted by the processing device or to provide instructions or data to the processing device, software and/or data could be embodied permanently or temporarily by some type of machinery, component, physical equipment, virtual equipment, computer storage media or device, or transmitted signal waves. Software could be dispersed in a networked computer system, and could be saved or executed in a dispersed way. Software and data could be saved in one or more computer reading recording media.

The method according to the embodiments could be embodied in the program command format that can be executed through various computing methods and recorded in computer readable media. The above computer readable media could include program commands, data files, data structures, and so on independently or in combination. The program commands recorded in the above media could be those specifically designed and configured for an embodiment or any computer software that is provided to those in the industry to be used. Examples of computer readable media include magnetic media such as hard disks, floppy disks, and magnetic tapes, optical media such as CD-ROM and DVD, magneto-optical media such as floptical disk, and hardware devices specifically configured to save and execute program commands such as ROM, RAM, and flash memory. Examples of program commands include not only machine language codes such as those created by compilers but also high level language codes that can be executed by computers by using such programs as the Interpreter. The above hardware device could be configured to operate in one or more software modules in order to execute the operations of an embodiment, and vice versa.

FORMATS OF THE EMBODIMENTS OF THE INVENTION

Although the above embodiment were described with limited embodiments and drawings, it is possible for those with ordinary level of knowledge in the applicable technical field to make various modifications and changes from the above indications. For example, the techniques described could be carried out in different orders from the method described and/or the components such as the described system, structure, device, and circuits could be integrated or combined in a different format from the method described, or could be replaced or substituted by other components or equivalents and achieve appropriate results.

Therefore, other examples and other embodiments, especially those that are equivalent to those in the scope of claims section belong to scope of claims section to be described later.

The invention claimed is:

1. A method of generating an image comprising:
   displaying a subject photographed by a camera on a display;
   displaying a multi-sticker selection function suitable for the simultaneous selection of multiple stickers on the display comprising a plurality of stickers configured to be placed within an image;
   receiving a selection of the plurality of stickers wherein at least one selection is a sticker designed for a particular advertisement;
   displaying, in response to receiving the selection of the plurality of stickers, at least one recommended sticker relating to the plurality of stickers within the multi-sticker selection function, wherein at least one of the recommended stickers relates to the particular advertisement;
   applying multiple stickers to the display of the photographed subject after receiving the selection of the plurality of stickers; and
   generating an image of the photographed subject with the plurality of stickers selected.

2. The method of generating an image according to claim 1, wherein a maximum number of stickers may be selected by the user, and after the maximum number of stickers selected by the user has been reached, stickers selected first among the plurality of selected stickers are de-selected and stickers selected last among the plurality of selected stickers are applied.

3. The method of generating an image according to claim 1, wherein, at least one recommended sticker relating to the plurality of selected stickers is additionally related to the region of the display associated with the selected plurality of stickers.

4. The method of generating an image according to claim 1, wherein, in response to a sticker designed for a specific area being selected by the user, at least one recommended sticker relating to the specific area is additionally provided as a selection within the multi-sticker selection function.

5. The method of generating an image according to claim 1, wherein a maximum number of stickers may be selected by the user, and, in response to the maximum number of stickers being selected by the user, the multi-sticker selection function is deactivated.

6. The method of generating an image according to claim 1, wherein the stickers comprise a video format file or consecutive image files.

7. An image generating apparatus comprising:
a processor;
a memory communicatively coupled to the processor;
a visual display;
a display component within the memory that directs the visual display to display a subject photographed by the camera;
an application component within the memory wherein, when multiple stickers or effects configured for placement within an image with the subject are selected using a multi-sticker function from the stickers or effects already provided, the application component directs the processor to determine at least one location feature of the displayed subject, and applies the above selected stickers or effects to the above displayed photographed subject based on the at least one determined location feature;
a recommendation component, wherein, in response to a first sticker or effect associated with particular advertisement is selected by the user, the recommendation component provides at least a second recommended sticker or recommended effect relating to the particular advertisement for placement within the image with the subject and a generating component within the memory that directs the processor to generate an image of the above subject being photographed to which the above selected stickers or effects are applied.

8. The image generating apparatus according to claim 7, wherein, a maximum number of stickers or effects may be selected by a user within a plurality of selected stickers or effects, and in response to an additional sticker or effect being selected by the user after the maximum number of stickers or effects has been reached, the application component eliminates a first sticker or effect initially selected within the plurality of selected stickers or effects and the additional sticker or effect is added to the plurality of selected stickers or effects.

9. The image generating apparatus according to claim 8, wherein in response to the maximum number of stickers or effects being selected, the application component deactivates the function which applies stickers or effects.

10. The image generating apparatus according to claim 7, wherein, in response to the selection of a sticker or effect for application to the photographed subject by the user, at least one recommended sticker or recommended effect relating to the selected sticker or effect is additionally applied to the photographed subject.

11. The image generating apparatus according to claim 7, further comprising a recommendation component that provides at least one recommended sticker or recommended effect relating to a specific area of the photographed subject in response to the user selecting a sticker or effect for the specific area.

12. The image generating apparatus according to claim 7, wherein each of the pre-installed stickers or effects is a video format file or consecutive image file.

13. A method of generating an image comprising:
displaying a subject photographed by a camera on a display;
determining at least one location feature of the displayed subject;
displaying a multi-effect selection function, wherein at least one effect is designed for a particular advertisement;
applying multiple effects to the display of the photographed subject after receiving a selection of a plurality of effects from the multi-effects function, wherein the selection of a plurality of effects includes at least one effect designed for a particular advertisement;
generating at least one recommendation effect within the multi-effect selection function, wherein the at least one recommendation effect is associated with the selected at least one effect designed for a particular advertisement;
wherein the application of the multiple effects is based on the at least one determined location feature; and
generating an image of the photographed subject with the plurality of effects selected.

14. The method of generating an image according to claim 13, wherein a maximum number of effects may be selected by the user, and after the maximum number of effects selected by the user has been reached, effects selected first among the plurality of selected effects are de-selected and effects selected last among the plurality of selected effects are applied.

* * * * *